United States Patent [19]

Sowa

[11] 4,196,413

[45] Apr. 1, 1980

[54] DOT-MATRIX TYPE VEHICLE CONDITION DISPLAY APPARATUS

[75] Inventor: Kunihiro Sowa, Okazaki, Japan

[73] Assignee: Nippon Soken, Inc., Nishio, Japan

[21] Appl. No.: 949,387

[22] Filed: Oct. 5, 1978

[30] Foreign Application Priority Data

Nov. 29, 1977 [JP] Japan .................................. 52-14386

[51] Int. Cl.[2] ...................... B60Q 11/00; G08B 23/00; G09F 9/32

[52] U.S. Cl. .................................. 340/52 F; 340/715; 340/792; 340/519; 340/521

[58] Field of Search ....................... 340/52 F, 715, 792

[56] References Cited

U.S. PATENT DOCUMENTS

| | | | |
|---|---|---|---|
| 3,566,388 | 2/1971 | Andrews et al. | 340/792 X |
| 3,573,790 | 4/1971 | Schulenburg et al. | 340/792 X |
| 3,623,070 | 11/1971 | Johnson et al. | 340/792 |
| 3,626,367 | 12/1971 | Howard et al. | 340/52 F |
| 3,947,811 | 3/1976 | Hodgson | 340/715 X |
| 3,988,730 | 10/1976 | Valker | 340/52 F |
| 4,024,531 | 5/1977 | Ashby | 340/792 X |
| 4,107,646 | 8/1978 | Arai et al. | 340/52 F |

FOREIGN PATENT DOCUMENTS 1427133 3/1976 United Kingdom .................. 340/52 F

*Primary Examiner*—David L. Trafton

*Attorney, Agent, or Firm*—Cushman, Darby & Cushman

[57] ABSTRACT

In a dot-matrix type vehicle condition display apparatus, binary coded signals corresponding to items to be displayed on a dot-matrix type fluorescent display tube are applied to portions of address input terminals of a memory, while binary coded signals corresponding to ordinal numbers of character columns of the items to be displayed are applied to other address input terminals of the memory. The memory produces a binary coded output corresponding to a character determined by signals at those address input terminals. The binary coded output of the memory is fed to a character generator, which in turn sequentially supplies signals corresponding to the respective column dots of that character to row drivers, which in turn cooperates with column drivers to dynamically scan the fluorescent display tube. The items displayed on the fluorescent display tube is moved or stopped in response to the actuation or deactuation of a start/stop switch.

5 Claims, 8 Drawing Figures

| | COLUMN 1 | COLUMN 2 | COLUMN 3 | COLUMN 4 | COLUMN 5 |
|---|---|---|---|---|---|
| ROW 1 | 1 | 1 | 1 | 1 | 0 |
| ROW 2 | 1 | 0 | 0 | 0 | 1 |
| ROW 3 | 1 | 0 | 0 | 0 | 1 |
| ROW 4 | 1 | 1 | 1 | 1 | 0 |
| ROW 5 | 1 | 0 | 1 | 0 | 0 |
| ROW 6 | 1 | 0 | 0 | 1 | 0 |
| ROW 7 | 1 | 0 | 0 | 0 | 1 |

DOT-MATRIX TYPE VEHICLE CONDITION DISPLAY APPARATUS

BACKGROUND OF THE INVENTION

The present invention relates to a dot-matrix type vehicle condition display apparatus for indicating fault locations of a vehicle or the like to a driver.

A display apparatus of a type in which characters are displayed and the displayed characters are sequentially moved, such as a talking sign, has been known, but the construction thereof is of such large scale and power consumption thereof is so high that it has not been used as a simple vehicle-mounted display apparatus.

It is an object of the present invention to provide a small-size and low power consumption dot-matrix type vehicle condition display apparatus which can sequentially move the displayed items or displayed images by the actuation of switches.

The above object of the present invention can be attained by a vehicle condition display apparatus which comprises a dot-matrix type fluorescent display tube, a memory for storing items to be displayed, a character signal generator for generating character signals in accordance with outputs of the memory and drivers such as IC drivers for firing the fluorescent display tube in accordance with outputs of the drivers.

According to the present apparatus, the respective items displayed can be simply checked and the images displayed can be visually recognized in a positive manner by a viewer by sequentially moving the displayed images.

Other objects, features and advantages of the present invention will be apparent from the following description of the preferred embodiments of the invention when taken in conjunction with the accompanying drawings.

DESCRIPTION OF THE PREFERRED EMBODIMENTS

Figure 1A:
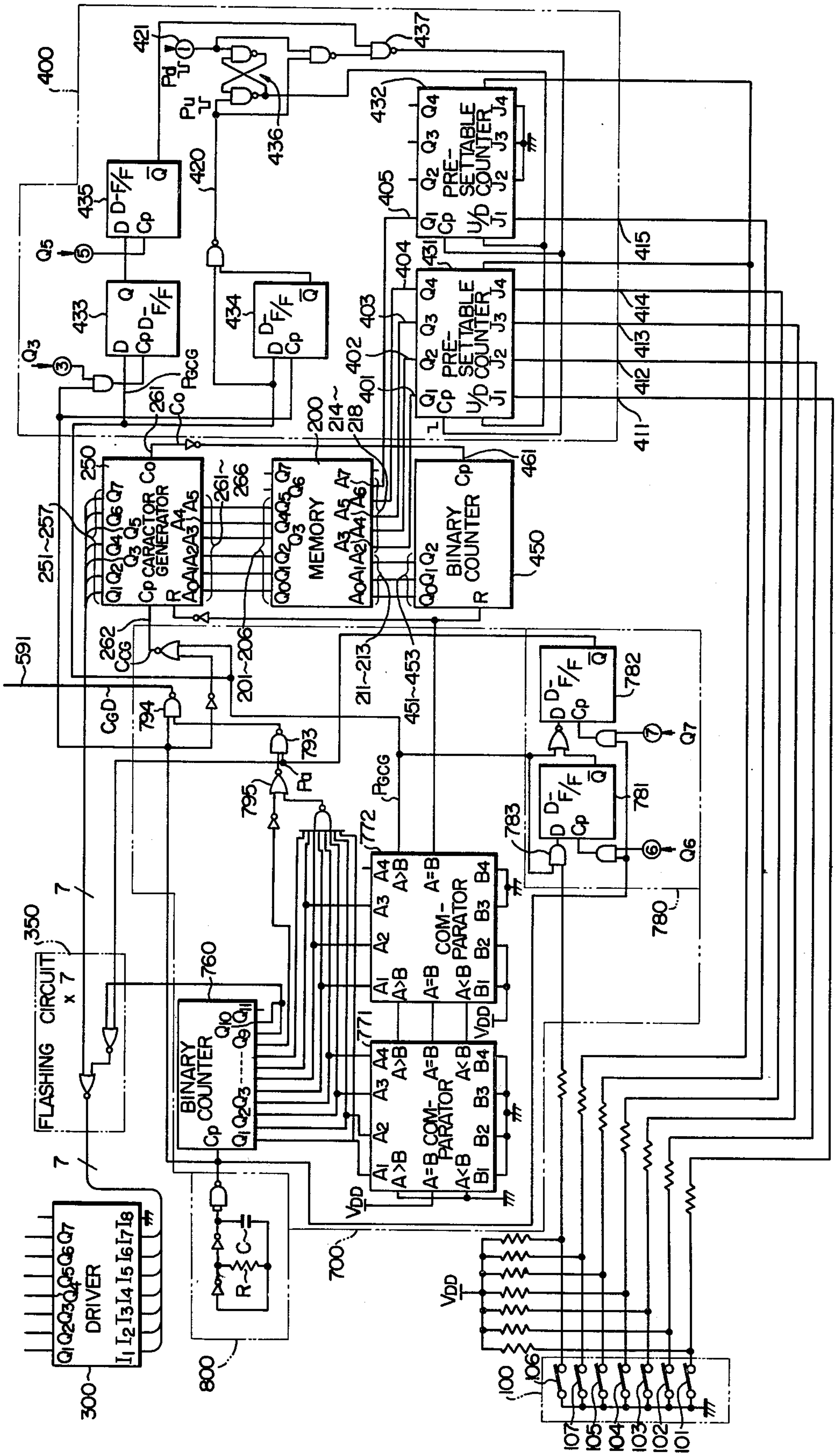
FIGS. 1A and 1B are electrical circuit diagrams illustrating one embodiment of the present invention.

Referring to the drawings, one embodiment of the present invention is explained in detail. The illustrated embodiment is a vehicle condition display apparatus using a fluorescent display tube in which a 10 row×52 column dot-matrix type fluorescent display tube is used to display each item composed of eight characters including alphabets and numerals. Thirty-two different displays per character can be selected by the combination of signals at five input terminals, and the movement and the stop of the displayed item as well as the automatic shift of the item are controlled by signals at the remaining two input terminals. In the following explanation, the numerals "0" and "1" represent binary numbers, and "0" in a signal circuit represents a low level while "1" represents an high level.

In FIG. 1A, numeral 100 denotes a selection switch circuit which comprises seven switches 101–107 each being adapted to be independently actuated or deactuated, of which the switches 101–105 are display item selection switches. One of 32 items to be displayed can be selected by a five-digit binary code by a particular one of 32 ($=2^5$) combinations of the on and off conditions of the switches 101–105. The remaining switches 106 and 107 are display mode selection switches, of which the switch 106 is a start/stop switch, which when closed, commands the movement of the displayed items and, when opened, commands the stop and the flashing of the displayed items. The switch 107 is a preset switch which when opened, commands the display of the items indicated by the display item selection switches 101–105 and, when closed, commands a sequential change of the thirty-two display items starting from the item preset when the start/stop switch 106 was in closed position.

Numeral 200 denotes a memory circuit which may be an M 51563S semiconductor memory manufactured by Mitsubishi Electric Corp. of Japan. In the memory circuit 200 of the present embodiment, it is so programmed that the signals representing the characters to be displayed are produced in the form of six-digit binary code called ASCII code from six output terminals 201–206. The memory circuit 200 selects a display item by five bits at address input terminals 214–218 and specifies eight characters composing the display item by three bits at the address input terminals 211–213. The ASCII code corresponding to the selected character is produced at the output terminals 201–206.

Figures 2, 3:
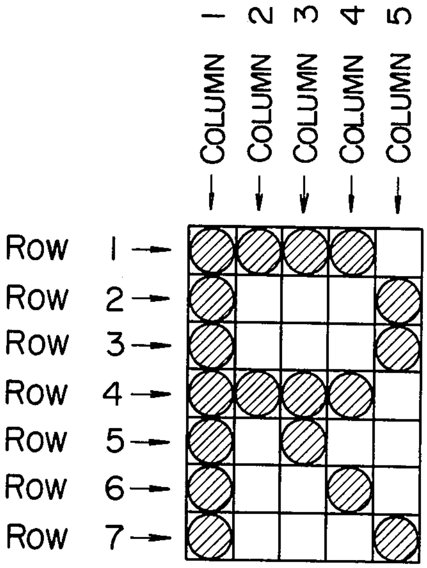
FIGS. 2 and 3 illustrate a manner in which a character is displayed.

Numeral 250 denotes a character generator which constitutes a character signal generator for generating a 5 column×7 row matrix character signal, which may be an F 3257 character generator manufactured by Fairchild and Camera Inc. of U.S.A. It sequentially produces the character signal five time, one column at a time, at output terminals 251–257 in accordance with the ASCII code output of the memory circuit 200 received at input terminals 261–266. For example, as shown in FIG. 2, a character "R" generated by the character generator 250 is displayed by hatched zones of thirty-five zones. The character signals corresponding to the character "R" are shown in FIG. 3. More particularly, when the character "R" is specified by the signals at the terminals 261–266 and a clock pulse CcG is applied to a clock terminal 262 from a timing pulse generator 700 to be described later, a signal "1 1 1 1 1 1 1" corresponding to the first column appears at the output terminals 251–257 corresponding to the first to seventh lines in FIG. 2, and when a second clock pulse CcG is applied to the clock terminal 262, a signal "1 0 0 1 0 0 0" corresponding to the second column appears. In this manner, at the fifth clock pulse CcG, one character (5 columns×7 rows) is completed.

Numeral 300 denotes a row driver or an anode driver which may be a KH 6816 driver manufactured by Toko Co., Ltd. of Japan, which drives an anode voltage of the fluorescent display tube to be described more fully hereinlater in accordance with the signals at the output terminals 251–257 of the character generator 250 for displaying the selected character.

Numeral 350 denotes a flashing circuit for interrupting the character signal applied to the anode driver 300 from the character generator in accordance with the output from the timing signal generator 700 for periodically flashing the display on the fluorescent display tube. Since the character generator 250 produces the seven-bit character signal, seven flashing circuits 350 one for each bit have to be provided.

Numeral 400 denotes a presettable counter which may include a CMOS IC CD4029 manufactured by RCA of U.S.A., in which five-bit outputs 401–405 specify higher order five-bit addresses 214–218 of the memory circuit 200 to determine the display item. When the preset switch 107 of the switch circuit 100 is open or when signal "1" is applied to terminals PE of counters 431 and 432, signals which are identical to those on input lines 411–415 which are connected to the item selection switches 101–105 appear at the output terminals 401–405. When the preset switch 107 is closed, the counters 431 and 432 alternately count up and down in accordance with the pulses from a column driver or grid driver 500 to be described later, the timing pulse generator 700 and a clock circuit 800, to switch the higher order five bits of the address to be applied to the memory circuit 200 for sequentially select each of the thirty-two display items. Each of the counters 431 and 432 is designed to be counted up by one when a signal "1" is applied to a terminal U/D and a "1" pulse is applied to a terminal Cp and counted down by one when a signal "0" is applied to the terminal U/D and the "1" pulse is applied to the terminal Cp. D-flip-flops 433, 434 and 435 in the presettable counter 400 are actuated in response to the firing condition of the fluorescent display tube 600 to actuate an R-S flip-flop 436 which in turn drives the counters 431 and 432. Among others, the D-flip-flops 433 and 435 detect whether all of the eight characters composing one item are entirely displayed in the fluorescent display tube 600, by using the output $P_{GCG}$ of the timing pulse generator 700 and the outputs ③ and ⑤ of a scale-of-64 counter in the grid driver 500. When they detect that all of the eight characters are displayed, a signal "0" is applied to a NAND circuit 437 to close it for stopping the count-up and count-down by the counters 431 and 432.

Numeral 450 denotes a character column ordinal number selection counter or a character selection counter which may be a binary counter such as CD 4022 manufactured by RCA. The character selection counter 450 counts up in response to a pulse $\overline{C_c}$ applied to a clock terminal 461 from the character generator 250 and supplies eight different binary codes corresponding to the number of characters composing one display item to three bit output terminals 451–453, which are connected to the address terminals 211–213 of the memory circuit 200 and selects eight characters composing the respective display item stored in the memory in response to the pulse $\overline{C_c}$.

The timing signal generator 700 may comprise a binary counter 760 which may include CD 4040 manufactured by RCA, digital comparators 771 and 772 each of which may include a CD 4063 manufactured by RCA, and various logic circuits. Periodic relation between the grid driver 500 and the character generator 250 is governed by the timing signal generator 700 and the start/stop circuit 780 which may include the D-flip-flops 781 and 782 such as RCA CD 4013 and AND circuits and NOR circuits, more particularly, when the start/stop circuit 780 operates to open the start/stop switch 106, the $\overline{Q}$ terminal of the flip-flop 782 of the start/stop circuit 780 produces a "0" output during the display of the item to open the NAND circuit 794, which in turn inverts the clock pulse Cp. Accordingly, the operation cycle of the grid driver 500 completely coincides with the operation cycle of the character generator 250 and the displayed time is not moved on the display tube 600. On the other hand, when the start/stop switch 106 is closed, the $\overline{Q}$ terminal of the flip-flop 782 produces a "1" output to open the NAND circuit 793, which inturns eliminates the clock pulses Cp to the grid driver 500 at a predetermined interval in response to an output Pa from the NOR circuit 795 for delaying the operation cycle of the grid driver 500 relative to the operation cycle of the character generator 250 to move the displayed item. A count "0 0 1 1 0 0 0 0" which represents the number of clock pulses equal to 6 columns×8 characters=48 has been set in the digital comparators 771 and 772 so that a signal $P_{GCG}$ having a duration corresponding to the number of the clock pulses Cp or 48 is produced at an A>B terminal.

The clock generator 800 comprises an oscillator of approximately 10 kHz including two inverters, resistors and capacitors, and a shaper, and it supplies the clock pulses Cp to the respective circuits described above to maintain proper timing relations among those circuits.

Figure 1B:
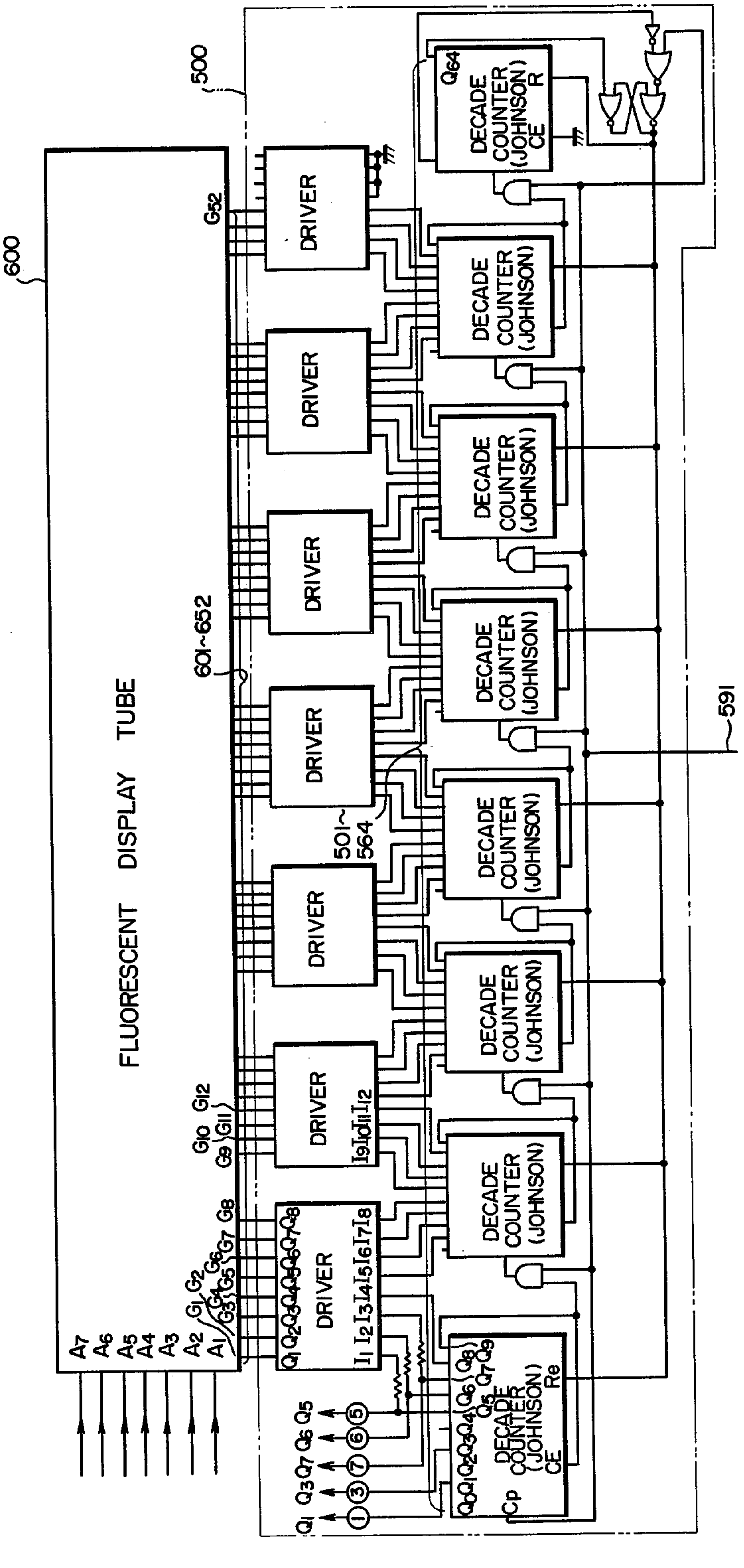

Referring to FIG. 1B, the numeral 500 denotes the grid driver comprising a scale-of-64 Johnson counter including eight RCA CD 4017's, seven AND circuits and four NOR circuits, and seven drivers. The grid driver 500 responds to the clock pulses Cp applied to a clock terminal 591 from the timing pulse generator 700 to sequentially shift the "1" signal one bit position at a time from an output terminal 501 to an output terminal 564. Connected to output terminals 601–652 of the seven drivers of the grid driver circuit 500 are 52 grids $G_1$–$G_{52}$ of the fluorescent display tube 600 to drive the grids one by one.

The fluorescent display tube 600 may be a 10×52 matrix type display tube having 10 column anodes and 52 column grids. It may be a DM-1 display tube manufactured by Futaba Denshi Co., Ltd. of Japan. In the illustrated embodiment, only seven anodes $A_1$–$A_7$ of the ten anodes are used. The grid terminals $G_1$–$G_{52}$ are sequentially selected for drive, one column at a time, by the grid driver 500 and the anode $A_1$–$A_7$ corresponding to the character at the selected grid is driven by the anode driver 300 by the output from the character generator 250.

Figure 4:
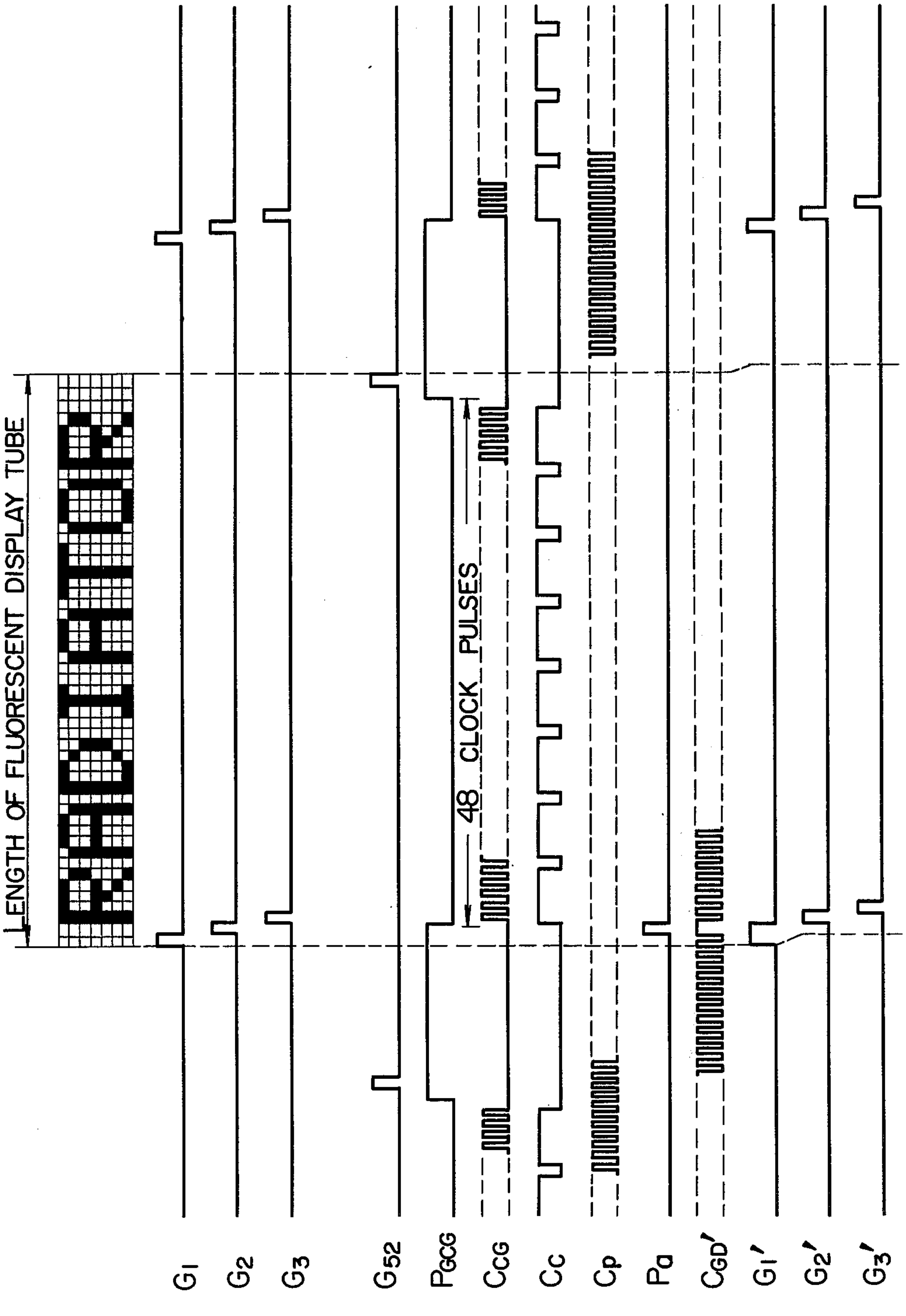
FIG. 4 shows signal waveforms illustrating a relation between the characters displayed and the waveforms at various points when only one item is displayed.
Figure 5:
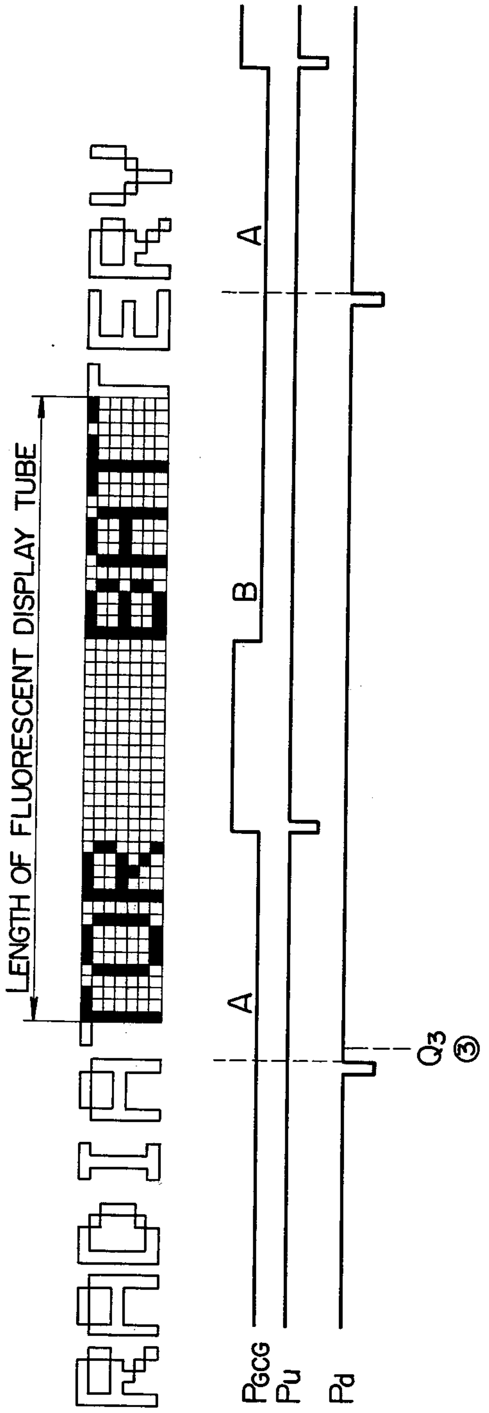
FIG. 5 shows signal waveforms illustrating a relation between the characters displayed and the waveforms at various points when two items are simultaneously displayed.

The operation of the present embodiment is now explained in conjunction with the waveforms shown in FIGS. 4 and 5, with reference to FIGS. 1A and 1B.

For example, when it is desired to display eight characters "RADIATOR" as the display item, this display item is specified by the binary codes generated by the selection switches 101–105. At this time, if the preset switch 107 is open and the presettable counters 431 and 432 have been preset, the output binary codes from the selection switches 101–105 are applied to the memory circuit 200. At this time, the output binary code "0 0 0" from the character selection counter 450 is also applied to the memory circuit 200. As a result, the memory circuit 200 produces the ASCII code representative of the first character "R" of the "RADIATOR", and the character signal generator 250 responds to the clock pulses CcG to produce the character signal shown in FIG. 3 representative of the character "R", five times, one column at a time. When one character of the character signals have been produced, the output of the character selection counter 450 changes from "0 0 0" to "0 0 1" in synchronism with the sixth clock pulse CcG so that the memory circuit 200 produces the ASCII code representative of the second character "A" and the character signal generator 250 produces the character signal representative of the character "A" five times, one column at a time. In the present embodiment, the 64 clock pulses Cp constitute one cycle for displaying one item, and the clock CcG are in synchronism with the clock pulses Cp as shown in FIG. 4. That is, the 52 grids $G_1$–$G_{52}$ of the fluorescent display tube 600 correspond to the fifth to fifty-seventh outputs 501–564 of the well-known scale-of-64 Johnson counter of the grid driver 500, and are driven by the outputs 601–652 of the seven drivers. The drive timings for the grids $G_1$, $G_2$, $G_3$ and $G_{52}$ are shown in FIG. 4 by $G_1$, $G_2$, $G_3$ and $G_{52}$. On the other hand, the pulses CcG which are equal in number to 6 (columns)$\times$8 (characters)=48 including one blank column between respective characters are supplied to the input terminal 262 of the character generator 250 from the timing pulse generator 700 during one cycle or the period of 64 clock pulses Cp so that the column signals from the anode driver 500 are changed in synchronism with the switching of the grids of the display tube 600. The character selection counter 450 is incremented one by one by the clock-out signals Cc shown in FIG. 4 which are produced at the terminal 261 simultaneously with sixth column blanking signals from the character generator 250, and the outputs 451–453 of the counter 450 are used to switch low-order three bits of the address of the memory circuit 200 to sequentially select the characters stored in the memory circuit 200. In this manner, the characters are sequentially displayed on the fluorescent display tube 600 in the sequence of R-A-D-A-T-O-R. Since the above operation is repeated more than one hundred times a second, the displayed item appears as if it is constantly displayed on the display tube.

When the start/stop switch 106 is open, the AND circuit 783 in the start/stop circuit 780 receives a "1" signal at one input thereof to open the gate thereof so that the output signal $P_{GCG}$ shown in FIG. 4 which is produced at the A>B terminal of the digital comparator 772 is applied to the D terminal of the D-flip-flop 781. As a result, the $\overline{Q}$ output of the D-flip-flop 781 assumes "0" level in synchronism with the output ⑥ of the Johnson counter and the $\overline{Q}$ output of the D-flip-flop 782 assumes "0" level in synchronism with the output ⑦ of the Johnson counter. Consequently, the NAND circuit 793 produces a "1" output when the leading edge of the display item which corresponds to the output ⑦ of the Johnson counter reaches the position of the third grid $G_3$ of the fluorescent display tube 600, to open the NAND gate 794. Since the pulse $C_{GD}$ applied to the grid driver 500 is a mere inversion of the clock pulse Cp, that is, $C_{GD}=\overline{C}p$, one cycle of the grid driver 500 is completely coincident with the cycle of eight characters or one item of the character generator 250. Therefore, the relative position of the grid position relative to the displayed characters is constant and the displayed characters remain unmoved. The $\overline{Q}$ output of the D-flip-flop 782 is also applied to the flashing circuit 350 to interrupt the input to the anode driver 300 in response to the periodic output signals of the counter 760. Accordingly, the display on the display tube 600 is flashed periodically.

When the start/stop switch 106 is closed, the AND circuit 783 in the start/stop circuit 780 receives a "0" signal at one input thereof to close the gate thereof. As a result, the $\overline{Q}$ outputs of the D-flip-flops 781 and 782 continuously produce "1" outputs which are applied to the NAND circuit 793. The output Pa of the NOR circuit 795 assumes a "1" level as shown in FIG. 4 only when the output of the binary counter 760 assumes a predetermined count, to apply the "0" signal, which has been inverted through the NAND circuit 793, to the NAND circuit 794. During that period, the NAND circuit 794 produces "1" output. As a result, the output CGD of the NAND gate 794 is modified to a signal CGD' as shown in FIG. 4, in which one clock pulse has been eliminated for each display cycle. As a result, the cycle of the grid driver 500 is delayed by one clock pulse relative to the cycle of the character generator 250 and the eight characters of the display item are moved to the left. The drive timing for the grids $G_1$, $G_2$ and $G_3$ of the display tube 600 are shown in FIG. 4 by $G_1'$, $G_2'$ and $G_3'$. In the present embodiment, the outputs Pa are produced once for every four frames (four cycles) of the signals $P_{GCG}$ shown in FIG. 4 by $P_{GCG}$ which correspond to one display unit and the duration of pulses is equal to one frame period (one cycle) of the clock pulse Cp.

Contrarily to the above example, when the preset switch 107 is closed, the display item on the display tube 600 moves and two display items are displayed on the fluorescent display tube 600. More particularly, as shown in FIG. 5, the n-th item is displayed at the position corresponding to "A" on the pulse $P_{GCG}$ produced by the digital comparators 771 and 772, and when the (n+1)th item is subsequently displayed at the position "B", the display of "A" terminates and a count-up pulse Pu which momentarily assumes "0" level as shown in FIG. 5 appears on the line 420 to the presettable counter 400 at the rise of the pulse $P_{GCG}$ by the delay function of the D-flip-flop 434. The condition of the R-S flip-flop 436 is inverted by the pulse Pu to produce "1" signal at the U/D terminal of the counter 432. Since the $\overline{Q}$ terminal of the D-flip-flop 435 normally produces "1" output, the NAND circuit 437 is open. Therefore, the "0" output is applied to the Cp terminals of the counters 431 and 432 slightly later so that the counters 431 and 432 count up by one to add one to the high order five bits of the address of the memory circuit 200 to increment the display item to the (n+1)th item. When the entire cycle of display is completed, the condition of the R-S flip-flop 436 is inverted by the pulse Pd, shown in FIG. 5, from the first output Q1 of the scale-of-64 counter (Johnson counter) of the grid driver 500. As a result, the "0" output is applied to the U/D terminals of the counters 431 and 432 and slightly later the "0" output is also applied to the Cp terminals so that the counters 431 and 432 are decremented by one. The output of the counter is applied to the memory circuit 200 to reset the display item to the n-th item. By repeating the above operation, two items can be sequentially displayed on the same display tube 600.

At the end of the n-th item, that is, when the rise of the output $P_{GCG}$ reaches the position of the output $Q_3$ of the scale-of-64 counter, the D-flip-flop 433 is flipped at the time of the occurrence of the output $Q_3$ and then the D-flip-flop 434 is flipped and the presettable counters 431 and 432 are incremented as described above. Thereafter, the output $\overline{Q}$ of the D-flip-flop 435 is flipped at the occurrance of the output $Q_5$ to close the NAND gate 437 to inhibit the supply of the pulse to the terminals Cp of the counters 431 and 432 for stopping the count-up and count-down operations thereof. Since the count-up and count-down operations are started again by the increment by the output $P_{GCG}$ after the completion of the display of the (n+1)th item, the (n+2)th item is displayed following to the (n+1)th item.

While one character is composed of 5 columns×7 rows in the above embodiment, similar display apparatus can be attained with 7 column×9 rows configuration or other configurations. Further, while the fluorescent display tube 600 is comprised of 10 rows×52 columns light emitting spots, similar display apparatus can be attained with a display tube having no less than 7 rows×47 columns of light emitting spots. In the above embodiment, one item is composed of eight characters because three bits of the address are used to select the characters, but it is possible without difficulty to compose one item by 8, 16, 32, . . . characters or $8\times2^n$ characters (where n is zero or natural number) by increasing the number of bits of the address used for selection.

While the circuits in the above embodiment are constructed by C-MOS IC's, hybrid IC's and transistors, similar display apparatus can be attained by constructing the circuits by TTL, $I^2L$ and/or other bipolar IC. It is also possible to construct the circuits by one or several IC's.

Figure 6:
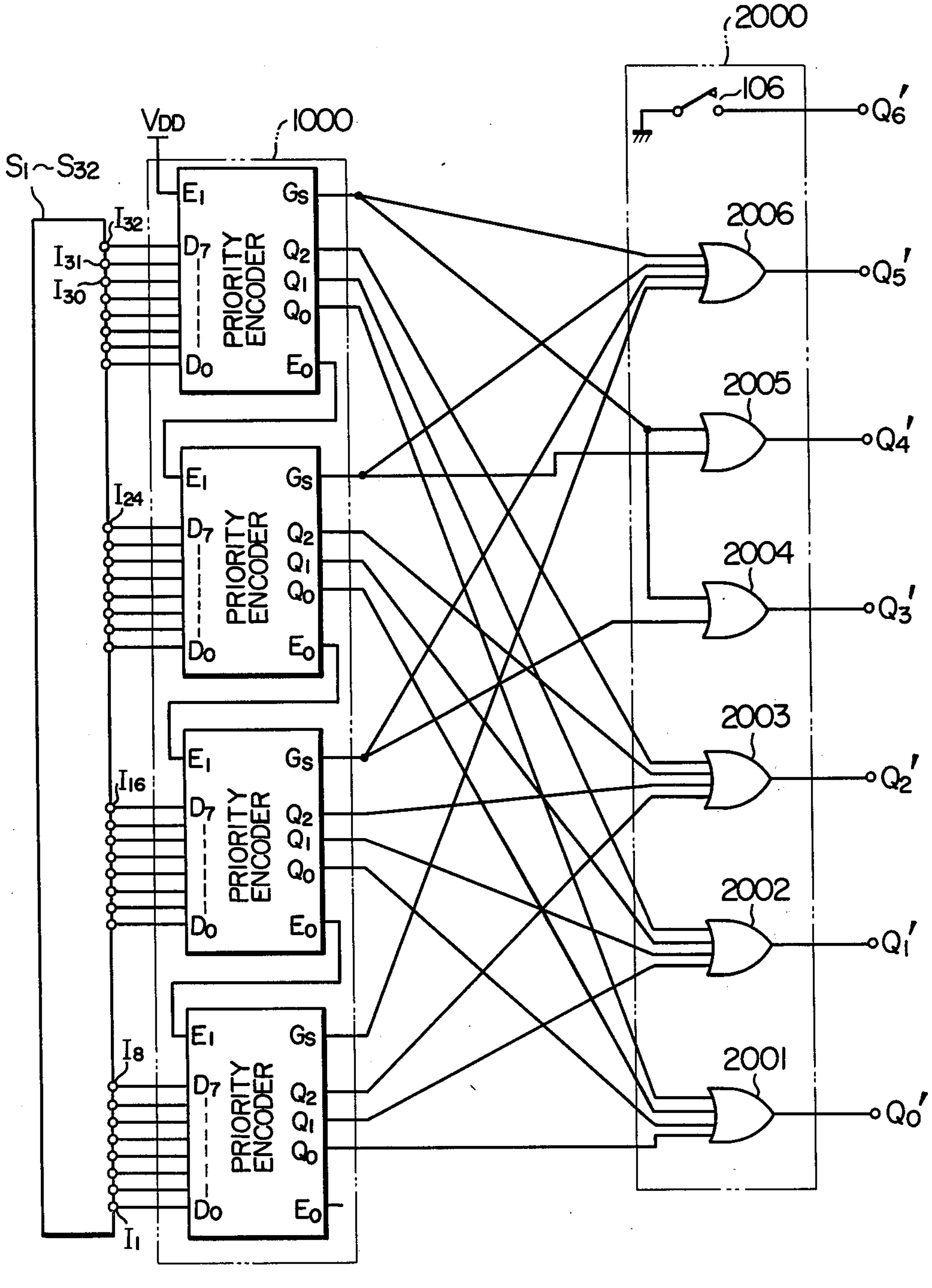
FIG. 6 is an electrical circuit diagram illustrating one embodiment of a control switch circuit.

While seven switches, that is, the item selection switches 101–105, the start/stop switch 106 and the preset switch 107 are included in the selection switch circuit 100 in the above embodiment, when it is desired to mount the display apparatus on a motor vehicle to display the faults of the various parts of the vehicle, thirty-two sensors S1–S32 each having binary status or "1" and "0" status as shown in FIG. 6 to detect the fault may be provided, and an encoder 1000 for determining the priority of the fault signals from the thirty-two sensors S1–S32 and a code converter 2000 responsive to the determination of the priority to convert the highest priority fault signal to a predetermined five-digit binary code and produce a fault indication signal indicating that a fault has been included may be provided. The five-digit binary code is then applied to the presettable counter 400 while the fault indication signal is used in substitution for the preset switch 107.

Figure 7:
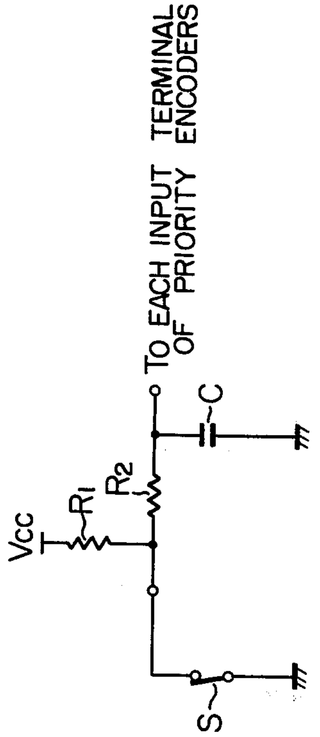
FIG. 7 is a specific circuit diagram of a sensor.

Each of the sensors may be constructed as shown in FIG. 7 when it is of normally closed type, in which S denotes a normally closed sensor, $R_1$ denotes a pull-up resistor, and $R_2$ and C denote a resistor and a capacitor constituting a protection circuit for an excessively large input. When the sensor S is of normally open type, it may be reversed. The encoder 1000 may comprise four priority encoders each may be RCA IC CD4532, in which an input terminal $I_{32}$ of input terminals $I_1$–$I_{32}$ is a highest priority input terminal and the priority descends in the order of $I_{31}$, $I_{30}$, . . . , $I_1$. Therefore, it is necessary to pay attention to the priority order when the sensors $S_1$–$S_{32}$ are interconnected. The code converter 2000 comprises OR circuits 2001–2005 for converting the signals to the five-digit codes, an OR circuit 2006 for determining whether the fault signal is included in any of the sensors $S_1$–$S_{32}$ to control the PE terminals of the counters 431 and 432 shown in FIG. 1B, and a manual switch 106 for controlling the movement and the stop of the displayed characters. Output terminals $Q_o'$–$Q_4'$ of the OR circuits 2001–2005 are connected to input terminals 411–415 of the presettable counter 400.

For example, when the break of a brake lamp of a motor vehicle and the decrease of amount of windscreen washing liquid occur simultaneously, the encoder 1000 determines the priority of them and the code converter 2000 produces a five-digit binary code indicative of the break of the brake lamp at the terminals $Q_o'$–$Q_4'$ and produces a fault indication signal at the terminal $Q_5'$. Those signals are applied to input terminals 411–415 and the PE terminals of the counters 431 and 432 of the presettable counter 400. As a result, even if the display apparatus is displaying an item, it immediately displays the item of the brake lamp. If the start/stop switch 106 is opened at that time, the characters of "BRAKE LAMP" are flashed while they are stopping the sequentially moving display, and if the switch 106 is closed the characters of "BRAKE LAMP" can be displayed while they are sequentially moved to the left.

When there is no fault in any of the items, the terminal $Q_5'$ of the code converter 200 produces a "0" output. Therefore, when the start/stop switch 106 is closed, each item is displayed while it is sequentially moved, and when the switch 106 is open, each item is displayed while it is flashed.

While the fluorescent display tube 600 of the illustrated embodiment is designed to constantly display the items, it is possible to automatically activate the display apparatus only when the motor vehicle is operated by controlling the supply of electric power in response to the actuation of an engine key switch. Furthermore, by controlling the firing of the fluorescent display tube 600 in accordance with the output at the terminal $Q_5'$ of the code converter 2000, it is possible to fire the fluorescent display tube 600 only when any fault occurs to save power consumption. It will also be easy to add a known control circuit so that other factors such as time are displayed on the fluorescent display tube 600 during the period other than fault period, that is, during normal operation period.

I claim:

1. A dot-matrix type vehicle condition display apparatus comprising:

an m columns×n rows dot matrix type display means;

a row driver connected to said display means for selectively driving the rows of said display means;

a column driver connected to said display means for sequentially driving the columns of said display means one at a time;

a circuit for selecting a display item;

a display item counter connected to said circuit for selecting the display item for producing a binary output signal representative of the display item;

a character ordinal number counter for producing a binary output signal representative of an ordinal number of a character column of the display item;

a memory circuit connected to said display item counter and said character ordinal number counter and adapted to receive said output signals of said counters to produce a binary coded output signal representative of a character determined by an address signal of said memory circuit;

a character signal generator connected to said memory circuit and said row driver for sequentially supplying column dots composing the character corresponding to the binary coded output of said memory circuit to said row driver, one dot at a time;

a timing signal generator connected to said column driver, said display item counter, said character ordinal number counter and said character signal generator for controlling operation timings of those circuits; and a display mode selection circuit connected to said timing signal generator for selecting a moving mode and a stop mode of the display item on said display means;

said timing signal generator being responsive to an output of said display mode selection circuit to cause said column driver and said character signal generating circuit to select the moving mode or the stop mode of the display item on said display means.

2. A dot-matrix type vehicle condition display apparatus according to claim 1, wherein said display item selection circuit includes;

a plurality of sensors for sensing the condition of the vehicle to produce fault signals when fault conditions are sensed; and an encoder connected to said sensors and said display item counter and responsive to the fault signal from said sensors to supply encoded signals representative of the fualt signals to said display item counter;

said display mode selection circuit being responsive to at least one of the fault signals from said sensors to produce the output signal so that the display item on said display means is displayed stationarily.

3. A dot-matrix type vehicle condition display apparatus according to claim 1 or 2, further comprising a flashing circuit means inserted between said row driver and said character signal generator and connected to said timing signal generator and responsive to the output of said timing signal generator to gate the signal from said character signal generator to said row driver for flashing the displayed item displayed stationarily on said display means.

4. A dot-matrix type vehicle condition display apparatus according to claim 2, wherein said encoder is adapted to encode the fault signals from said sensors in accordance with a predetermined priority.

5. A dot-matrix type vehicle condition display apparatus according to claim 1, wherein said timing signal generator includes:

a clock generator;

a binary counter connected to said clock generator for counting pulses from said clock generator;

a digital comparator connected to said binary counter for comparing the content of said binary counter with a predetermined count to reset said character ordinal number counter when the content of said binary counter reaches said predetermined count;

a first gate means connected to said digital comparator, said clock generator and said character signal generator and responsive to the output signal of said digital comparator to gate the clock pulses from said clock generator to said character signal generator; and a second gate means connected to said binary counter, said display mode selection circuit, said clock generator and said column driver and responsive to said predetermined count of content of said binary counter when said display mode selection circuit is in the moving mode to gate the clock pulses from said clock generator to said column driver for causing a scan period of said column driver to differ from a scan period of said character signal generator.

* * * * *